United States Patent Office.

CARL FRIEDRICH LUDWIG WANDEL, OF WALDAU, NEAR BERNBURG, NORTH GERMAN CONFEDERATION, ASSIGNOR TO F. O. MATTHIESSEN AND W. A. WIECHERS, OF NEW YORK, N. Y.

Letters Patent No. 90,616, dated May 25, 1869.

IMPROVEMENT IN REFINING SUGAR.

The Schedule referred to in these Letters Patent and making part of the same.

Specification of an Improvement in the Manufacture or Refining of Sugar, by CARL FRIEDRICH LUDWIG WANDEL, of Waldau, near Bernburg, in the Duchy of Anhalt, North German Confederation.

The raw sugar, molasses, cane-juice, sirup, and other saccharine matters used in the manufacture of refined sugar, are ordinarily more or less of an acid nature, containing carbonic, acetic, lactic, and other acids, injurious to the sugar, and objectionable to the refining of it, and have, when respectively dissolved in or diluted with water, a cloudy and impure appearance, owing to organic matters of different natures contained in them.

In the ordinary process of sugar-refining, the raw materials, as above mentioned, after being reduced by water to a suitable liquid state, generally below a density of 30° Baumé, have had to pass through neutralizing and clarifying-processes, the one consisting in an addition to the liquid of an alkaline matter (generally lime) until the acidity disappears, and the other in the addition of a clarifying agent, as albumen, (generally in the shape of blood,) after which the liquid is heated, skimmed off, and filtered through cloth and bone-black.

In such mode of treatment, the neutralization by lime is objectionable, on account of its discoloring the saccharine solution, and of its forming, with most of the acids contained in the raw material, soluble salts, which remain in the sugar-liquor, and are objectionable to the refiner, as the sugar-liquor, thus treated with lime, requires, in the further process of refining, a much larger quantity of animal-charcoal or bone-black for purification and decolorization than otherwise would be required.

The blood, which is used only on account of the albumen which it contains, and which, when heated to coagulation, serves to clarify the sugar-liquor, adds, besides the albumen, so many other substances, acting as impurities, to the sugar-liquor, that its use is by many refiners considered more injurious than beneficial.

These objections are entirely overcome by my invention or mode of treatment, which consists in the use of hydrate of magnesia, or phosphate of magnesia, or both combined, as neutralizing and clarifying-agents.

The hydrate of magnesia neutralizes the acid contained in the raw material, without injuring the color of the latter, even when added in excess, (that is, beyond the amount required for neutralization,) and most of the salts formed in this process being insoluble, can be removed by a mere filtration through cloth, after the main portion has been brought to the surface of the sugar-liquor by heating, and been skimmed off.

An addition of phosphate of magnesia is valuable, inasmuch as said substance acts as an antiseptic and excellent clarifier, and though it does not exclude the use of blood or any other clarifying-agent, makes them unnecessary.

The mode of treatment may be as follows:

To the sugar-liquor, of 30° Baumé, or any other saccharine solution under treatment, obtained in the ordinary way of sugar-refining, is added either hydrate of magnesia, or phosphate of magnesia, or both combined, in any desired or sufficient quantities, according to the saccharine solutions under treatment, and, while no excess will be injurious, it is not necessary to add more hydrate of magnesia than is necessary for neutralization.

The mixture is subsequently heated to or near the boiling-point, and skimmed off and allowed to settle, after which the bright liquor is drawn off from the residuum, and treated in the ordinary way of refining.

What is here claimed, and desired to be secured by Letters Patent, is—

The use of hydrate of magnesia, or phosphate of magnesia, or both combined, as neutralizing and clarifying-agents in the process of sugar-refining, substantially as specified.

This specification signed by me, this 12th day of January, 1869.

CARL FRIEDRICH LUDWIG WANDEL.

Witnesses:
CARL HEINRICH KNOOP,
EDWARD JUSTUS THODE.